T. J. PENNINGTON.
METHOD OF AND APPARATUS FOR SEPARATING RUBBER SUBSTANCES OF DIFFERENT DENSITIES.
APPLICATION FILED APR. 28, 1916.
1,195,264.
Patented Aug. 22, 1916.
2 SHEETS—SHEET 1.
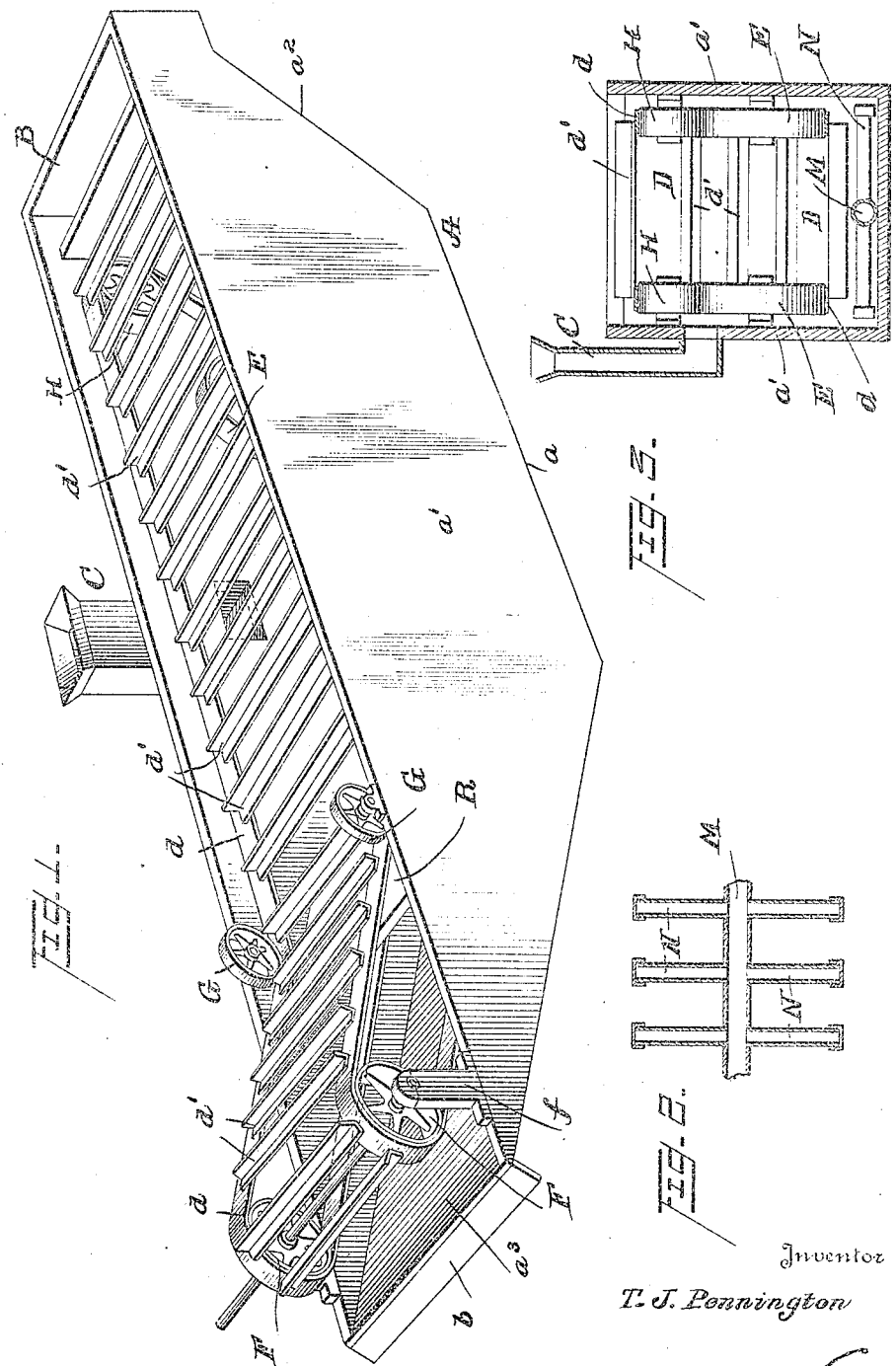
Inventor
T. J. Pennington
By his Atty's,

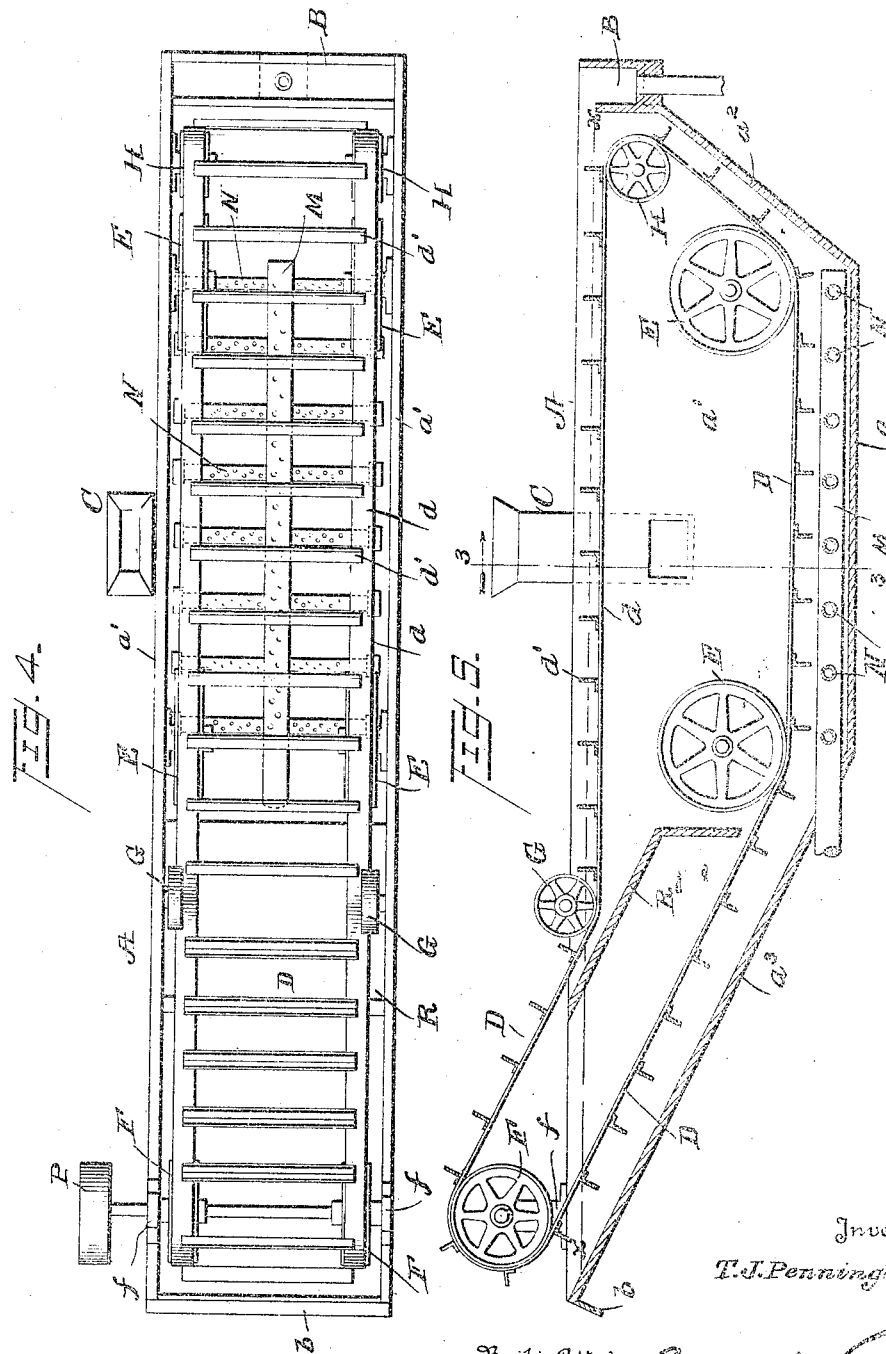

UNITED STATES PATENT OFFICE.

THOMAS J. PENNINGTON, OF CHICAGO, ILLINOIS.

METHOD OF AND APPARATUS FOR SEPARATING RUBBER SUBSTANCES OF DIFFERENT DENSITIES.

1,195,264.

Specification of Letters Patent.

Patented Aug. 22, 1916.

Application filed April 28, 1916. Serial No. 94,104.

*To all whom it may concern:*

Be it known that I, THOMAS J. PENNINGTON, a citizen of the United States, residing in Chicago, in the county of Cook and State of Illinois, have invented certain new and useful Improvements in Methods of and Apparatus for Separating Rubber Substances of Different Densities, of which the following is a specification.

This invention relates particularly to the separation of rubber substances of relatively high density from those of lower density, but some parts of my invention may be used for other purposes.

My improvements may be advantageously used in reclaiming rubber of different densities from automobile tires of the kind in which the stiff beads ordinarily connected with the wheel rims are made of vulcanite or hard rubber surrounded by a casing of several layers of fabric impregnated with a good grade of rubber compound.

Ordinarily the beads are first stripped from their casings in such manner as to leave as little of the casings as possible adhering to them and the bead is then reduced by rolls and is otherwise treated to obtain a mixture of the relatively hard vulcanite and the less dense rubber compound which is usually in a shredded condition and has a specific gravity varying from 1. to 1.25, while the specific gravity of the vulcanite is from 1.40 to 1.50. Various methods have been used for separating these two grades of rubber but according to my invention I accomplish such separation in a novel and better way which involves a new method and improved apparatus for practising such method.

While my invention is applicable to the separation of various substances of different specific gravities or different settling rates, it is most advantageously used in the separation of different kinds of rubber and by way of example will hereinafter, for the most part, be described as so used.

In carrying out my invention I first reduce the rubber substances to a pulp in water and with this pulp I mix an oily substance which will produce a sticky, viscous film on the surface of a settling bath contained in a vessel to the lower portion of which air under low pressure is admitted for the purpose of gently agitating the liquid and causing the particles of low specific gravity to rise with the oily substances to the surface of the bath while the heavier particles are allowed to settle. The film on the surface containing the lighter rubber is continuously skimmed from the bath by a slowly moving flight conveyer, while the heavier particles which settle are continuously removed by the same conveyer.

The oily substance which I employ for the purpose above stated is preferably a mineral oil, such as heavy engine oil or crude petroleum, as such oils form on the surface of the bath a dense film and being quite viscous serve to mechanically combine with the rubber with which it comes in contact. Pine oil and creosote which serve also to produce a film while to some extent holding the floating particles, have not sufficient density or viscosity to produce the best results.

The accompanying drawings show apparatus constructed in accordance with my invention which may be employed in practising my method of separation.

Figure 1 is a perspective view of my apparatus. Fig. 2 is a detail view in section of the air pipes preferably employed. Fig. 3 shows a vertical section on the line 3—3 of Fig. 5. Fig. 4 is a plan view. Fig. 5 shows a longitudinal section.

The settling vessel A may be made of any suitable material and it is suitably shaped to contain a liquid charged with the substances to be separated and to accommodate the conveyer and the air supply pipes. As shown the bottom $a$ of the vessel is straight or flat and its sides $a'$ are vertical. One end wall $a^2$ is inclined outwardly and upwardly and supports an overflow launder B for the floating substances. The other end wall $a^3$, which is somewhat longer than the wall $a^2$, extends upwardly and outwardly from the bottom $a$ to an overflow $b$ for the settled material.

The material to be treated is preferably introduced through a supply chute C opening into the settling vessel below the liquid level $x$, $x$.

D indicates an endless conveyer comprising chains or belts $d$ and flights $d'$. This conveyer is so guided that it carries the settled material from the lower portion of the settling vessel up the incline $a^3$ and over the discharge board at $b$, and it also carries the floating material at and near the liquid level into the overflow launder B. To thus guide the conveyer pulleys E are mounted in the lower part of the vessel A near the opposite ends of its bottom in such manner as to provide the conveyer with a straight portion a short distance above the bottom a. Pulleys F are mounted on standards f near the upper end of the incline $a^3$ in such positions as to cause the conveyer to travel a short distance above said incline. After leaving the pulleys F the conveyer passes under pulleys G and over pulleys H suitably located as shown to provide a straight horizontal upper portion in the conveyer near the liquid level and extending from a point above the lower portion of the incline $a^3$ to a point close to the overflow launder B. The conveyer may be driven in any suitable way as by power applied by a pulley P on the shaft of the pulleys F.

In the lower portion of the settling vessel I provide means for supplying air under low pressure for the purpose of producing gentle agitation in the liquid and for raising the lighter particles to the surface of the bath without interfering with the settling of the particles of higher specific gravity. For this purpose I preferably employ perforated pipes comprising a horizontally arranged longitudinal pipe M and branch pipes N. As shown in Fig. 4 these perforations are staggered in order that the jets of air may be better distributed. Any desired number of main or longitudinal pipes and branch pipes may be employed, but inasmuch as the conveyer moves the settling particles crosswise over the pipes, such particles are all caught by the upwardly directed air jets and the lighter ones rise with the air to the top of the bath with the oily liquid with which they mechanically combine to form a film or surface layer which is carried by the conveyer to the launder B. For these reasons it is not necessary that the branch pipes should be numerous or placed very close together.

It will be understood that the pulp mixed with oil is continuously supplied to the settling vessel and that a film is being continuously formed which is continuously removed by the slowly moving conveyer. A baffle R is installed in the vessel A above the incline $a^3$ outside the active agitation zone of the vessel and serves to prevent the lighter material from being drawn toward the overflow b where the settled material is discharged.

The apparatus thus described is most efficient when used in the manner specified for separating different kinds of rubber. It has however points of novelty which adapt it for use in other processes. It is not essential that the oily substances should be mixed with the pulp before the latter enters the settling vessel. It may be supplied to the surface of the bath in such manner as to form a film thereon, in which case the air jets will cause the lighter particles to rise and adhere to the film. I prefer however to admit the oil with the pulp in the manner before described. It will be understood that should the substances thus separated be not entirely clean, i. e., should the overflowing material still contain some of the heavier material and the settled material some of the lighter substances they may be further treated in similar apparatus and by a similar method to more completely effect the required separation.

As before stated, I prefer to use a heavy oil which will produce a sticky or viscous film on the settling bath and which tends to bind together substances rising to the surface. Ordinary cup grease might be used but engine oil or petroleum is preferred. Fairly good results may be obtained by the use of creosote or pine oil which would produce surface tension but would not have sufficient viscosity to produce the best results, especially where the process is used for reclaiming rubber compounds.

I claim as my invention:

1. A process of separating rubber-containing material, consisting in delivering to a settling bath having a surface layer of an oily viscous substance a liquid pulp containing disintegrated rubber compounds of different specific gravities, gently agitating the bath by gaseous fluid currents and thereby bringing the lighter rubber compounds into contact with the surface film and retaining them there, permitting the heavier compounds to settle, and separately removing the so separated compounds.

2. A process of separating rubber-containing material, consisting in maintaining on a settling bath a surface layer of an oily viscous substance, delivering to the settling bath a liquid pulp containing disintegrated rubber compounds of different specific gravities, gently agitating the bath by gaseous fluid currents and thereby bringing the lighter rubber compounds into contact with the surface film and retaining them there, permitting the heavier rubber compounds to settle, and separately removing the so separated compounds.

3. The process of separating rubber-containing material, consisting in mixing a liquid pulp containing disintegrated rubber compounds of different specific gravities with an oily viscous substance, delivering the mixture to a settling bath having a surface layer of such oily viscous substance, gently agitating the bath by gaseous fluid currents and thereby bringing the lighter rubber compounds into contact with the surface film and retaining them there, permitting the heavier compounds to settle and separately removing the so separated compounds.

4. The apparatus hereindescribed for separating substances of different specific gravities, comprising a settling vessel having at one end a launder receiving the overflow from said vessel and at the opposite end an overflow for the settled material, a flight conveyer mounted and guided in said settling vessel, one portion of which moves straight across the lower portion of the vessel to collect the settled material, another portion of which moves upwardly and outwardly to convey the settled material to a point above the liquid level to discharge it, and another portion of which conveyer extends straight across the vessel near the liquid level therein and delivers the floating material on the bath to the overflow launder, air supply pipes in the lower portion of the vessel to produce agitation in the bath, and a baffle interposed between the discharge portion of the vessel and the agitation zone thereof and which prevents the liquid from flowing from the surface of the vessel toward the discharge portion thereof and confines the material floating on the bath to the settling and agitation part of the bath.

In testimony whereof, I have hereunto subscribed my name.

THOMAS J. PENNINGTON.

Witnesses:
W. R. CURTIS,
J. S. GLEASON.